United States Patent
Bourdev et al.

(10) Patent No.: US 6,859,553 B1
(45) Date of Patent: Feb. 22, 2005

(54) FLATTENING IMAGES WITH ABSTRACTED OBJECTS

(75) Inventors: Lubomir D. Bourdev, Cupertino, CA (US); Stephen N. Schiller, Hayward, CA (US)

(73) Assignee: Adobe Systems Incorporated, San Jose, CA (US)

( * ) Notice: Subject to any disclaimer, the term of this patent is extended or adjusted under 35 U.S.C. 154(b) by 662 days.

(21) Appl. No.: 09/816,803

(22) Filed: Mar. 23, 2001

(51) Int. Cl.[7] .......................... G06K 9/00; G06K 9/36
(52) U.S. Cl. ....................... 382/173; 382/284
(58) Field of Search ................. 382/162, 164, 382/173, 175, 178, 180, 181, 199, 203, 224, 254, 266, 284; 345/418, 420, 581, 586, 587, 590, 592, 593, 597, 602, 611

(56) References Cited

U.S. PATENT DOCUMENTS

| | | | | |
|---|---|---|---|---|
| 5,153,937 A | * | 10/1992 | Wobermin et al. | 345/592 |
| 5,534,915 A | * | 7/1996 | Sandrew | 348/29 |
| 5,589,851 A | * | 12/1996 | Valdes et al. | 345/611 |
| 5,600,763 A | * | 2/1997 | Greene et al. | 345/420 |
| 5,649,083 A | * | 7/1997 | Barkans et al. | 345/597 |
| 5,818,962 A | * | 10/1998 | Mizukami | 382/180 |
| 5,841,443 A | * | 11/1998 | Einkauf | 345/586 |
| 6,011,595 A | * | 1/2000 | Henderson et al. | 348/590 |
| 6,389,161 B1 | * | 5/2002 | Krabbenhoft | 382/167 |
| 6,553,139 B1 | * | 4/2003 | Kaup | 382/167 |

* cited by examiner

Primary Examiner—Andrew W. Johns
Assistant Examiner—Amir Alavi
(74) Attorney, Agent, or Firm—Fish & Richardson P.C.

(57) ABSTRACT

Methods and apparatus, including computer program products, for flattening an image. In one aspect, the invention provides a method that includes receiving an image having multiple objects with each object having an original outline. Objects from among the multiple objects are selected to be abstracted objects. A planar-mapping outline is defined for each object. The planar-mapping outline of each selected object is an enclosing outline that encloses the object, and the planar-mapping outline of each object not selected is the original outline of the object. The image is divided into non-overlapping regions by using the planar-mapping outlines of all the objects. Each region is flattened.

50 Claims, 8 Drawing Sheets

FLATTENING IMAGES WITH ABSTRACTED OBJECTS

BACKGROUND

The present invention relates to compositing and flattening images.

Many image processing computer programs, such as the Adobe Illustrator® program, available from Adobe Systems Incorporated of San Jose, Calif., build a final image by compositing two or more graphical objects together. The objects may be thought of as drawn on stacked sheets of acetate. An image thus composited can have multiple objects on multiple layers of acetate.

Each object typically includes data and compositing controls. An object can have a value that represents the object's color. An object can have a second value that represents the object's degree of transparency. This second value can cause the object to be represented as one that is opaque, translucent, or transparent. An object can be represented by an array of pixels or analytically, e.g., by using segment paths to represent shape outlines, or by other functions which map positions to data values. A shape outline of an object is the outline of the object's shape. For example, the shape outline of a dot is its circumference. Shape outlines will be referred to as outlines.

Some of the objects can overlap, some can be transparent, and some overlapping objects can be transparent. When a transparent object overlaps other objects, the underlying objects, i.e., those on an underlying sheet, are viewable.

Flattening is the process of converting an image containing transparency into a visually identical image that does not contain transparency. One method of flattening involves planar mapping, a process that divides overlapping objects into atomic regions based on the intersections of the overlapping objects' respective outlines. Where segment paths analytically represent outlines, this division is usually performed by calculating the intersections of the segment paths of the overlapping objects. Outlines used for planar mapping will be referred to as planar-mapping outlines.

When flattening involves text, calculating path intersections as described above can be computationally intensive and can significantly burden computing resources. Several factors contribute to this problem. First, text outlines are typically complex and, accordingly, require numerous segment paths for representation. An object having many segment paths usually requires more processor time and memory to flatten than does one having few segment paths. Furthermore, text outlines are often curved and need to be described by second or third order expressions such as Bezier functions. Second or third order expressions usually require more processor time to flatten than do first order expressions. Additionally, because text outlines are often complex, the planar mapping of images involving text typically results in smaller and more numerous atomic regions than does planar mapping of images not involving text. An image having many small regions usually requires more processor time and memory to flatten than does an image having a few large regions. Thus, one problem in flattening images having text is that the process often requires great computing resources.

Another problem with flattening an image having text is that sometimes the font outlines required for planar mapping are unavailable. For example, some fonts have protected outlines and hence do not allow access to their segment paths. Additionally, some fonts such as bitmap fonts do not have outlines at all. Yet another problem with flattening an image having text arises from the conversion of native font information to outlines of text glyphs. Native font information, such as hinting data, is often not preserved in the conversion. Consequently, the quality of the flattened text can suffer, especially when the font size is small.

Objects that are not text can also present difficulties in flattening. For example, some objects have resolution-dependent outlines that are, thus, unavailable for planar mapping without a target resolution. These objects include ones having stroke instructions defining a width of the stroke based on a resolution of a selected output device. Also included are objects that have parametric bi-cubic or quadratic surfaces that define an outline based on a target resolution.

SUMMARY

The present invention provides methods, and apparatus including computer program products, for flattening an image.

Methods and apparatus in accordance with the invention efficiently employ computing resources to flatten an image. With respect to text, this efficiency is accomplished by defining a second outline for text objects, which usually have complex original outlines. The second outline encloses the text object and is simpler than the text object's original outline. The second outline requires few segment paths and no Bezier functions to represent. The reduction in the number of segment paths and the absence of Bezier functions reduce the amount of computing resources needed to flatten an image. Moreover, the second outline reduces the number of regions formed from planar-mapping because the second outline is generally larger than original outline of text objects. The reduction in the number of regions reduces the amount of computing resources needed for flattening.

Methods and apparatus in accordance with the invention can also flatten images having objects with resolution-dependent outlines. This capability is accomplished by defining an outline for these types of objects. The outline defined in this case is similar to the second outline defined for text objects.

In general, in one aspect, the invention provides a method that includes receiving an image having multiple objects with each object having an original outline. Objects from among the multiple objects are selected to be abstracted objects. A planar-mapping outline is defined for each object. The planar-mapping outline of each selected object is an enclosing outline that encloses the object, and the planar-mapping outline of each object not selected is the original outline of the object. The image is divided into non-overlapping regions by using the planar-mapping outlines of all the objects. Each region is flattened.

In general, in another aspect, the invention provides a method that includes receiving an image having multiple objects with each object having an original outline. Objects from among the multiple objects are selected to be abstracted objects. A planar-mapping outline is defined for each object. The planar-mapping outline of each selected object is an enclosing outline that encloses the object, and the planar-mapping outline of each object not selected is the original outline of the object. The image is divided into regions that can overlap by using the planar-mapping outlines of the non-abstracted objects. None of the regions is intersected by a planar-mapping outline of a non-abstracted object. Each region is flattened.

The invention can be implemented to realize one or more of the following advantages. A system in accordance with the invention abstracts complex geometry out of planar maps and, thus, reduces the required computing resources such as memory and processor time. The system preserves native font information and hence improves the quality of fonts in a flattened image. Furthermore, the system can flatten images that have fonts for which segment paths are not available (such as bitmap fonts and protected fonts). The system can flatten images that have objects having resolution-dependent outlines. A method implementing the invention can be applied not only to objects in PostScript® formats, but also to objects in other formats such as the Folio, TrueType, and IKARUS formats.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
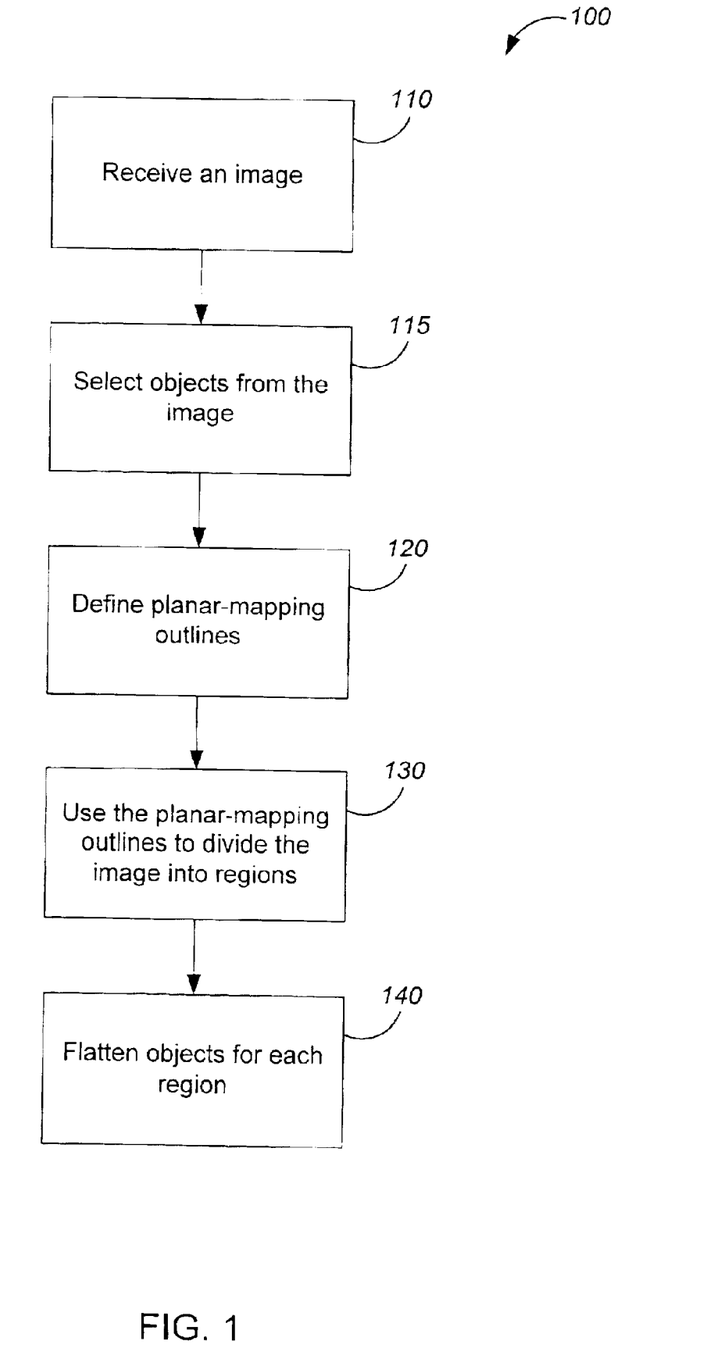
FIG. 1 is a flow chart of a method of flattening a layered image in accordance with the invention.

As shown in FIG. 1, a system that flattens an image having transparent objects performs a method 100 for flattening an image in accordance with the present invention. The system receives an image having multiple objects (step 110). Some of the objects can be transparent so that underlying objects are viewable. Each object in the image has an original outline, i.e., the object's real outline. For example, if the image contains a circle and the letter A, the original outline of the circle is the circumference of the circle and the original outline of the letter A is the outline of the glyphs that represents the letter A.

Some of the objects can have original outlines that are unsuitable for use in planar mapping the received image. These unsuitable outlines include complex outlines, such as text outlines, and outlines that are resolution dependent, such as the above-described outlines that have resolution-dependent stroke instructions. For each object having an unsuitable outline, the system defines a second outline that is more suitable for use in planar mapping. Usually, this second outline is resolution-independent and is simpler than an object's original outline. Objects having the simpler outline will be referred to as abstracted objects. The planar-mapping outline for an abstracted object is its simpler outline.

For objects that have original outlines suitable for planar mapping, the system uses their original outlines. These objects will be referred to as non-abstracted objects. The planar-mapping outline for a non-abstracted object is its original outline.

Figure 2:
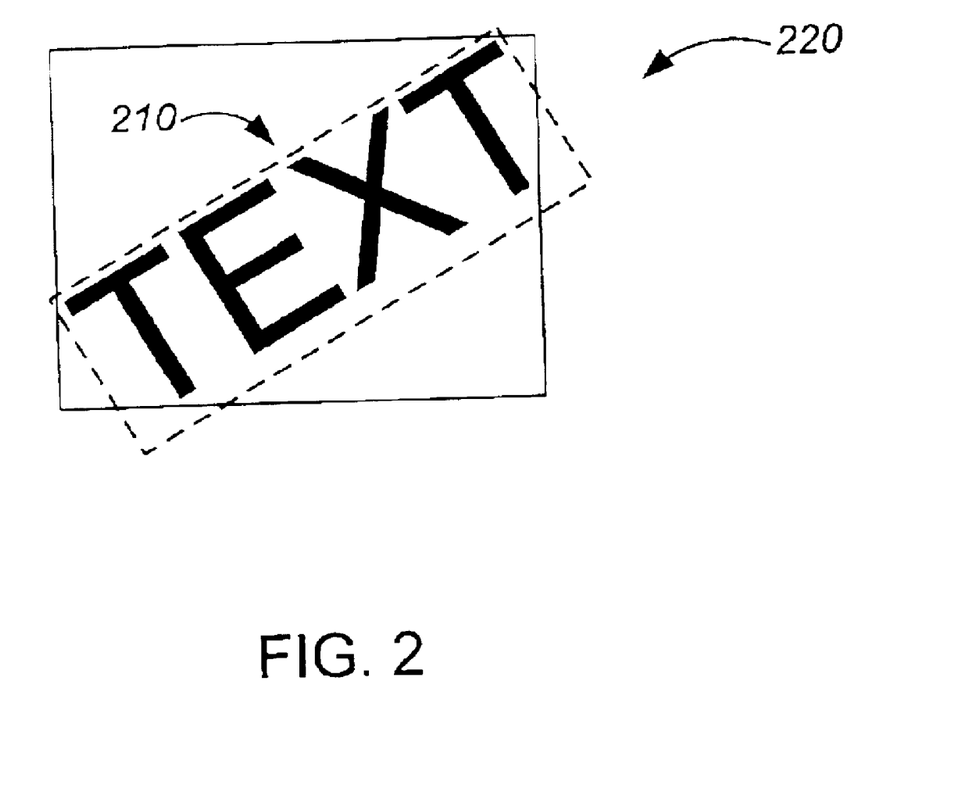
FIG. 2 shows an oriented bounding box of an object.

In the present implementation, the system defines simpler outlines for text and for objects having resolution-dependent outlines. The system selects these objects to be abstracted objects (step 115) and defines a simpler outline as each object's planar-mapping outline (step 120). The simpler outline is a bounding box that encloses the object for which it is being defined. The bounding box is advantageously of a minimal size while still enclosing the selected object. Minimizing the size of the bounding box reduces the probability of the bounding box intersecting another object, consequently reducing the number of regions created in the planar mapping process. When necessary, the bounding box can be rotated or oriented with respect to its object to further minimize its size. For example, as shown in FIG. 2, oriented bounding box 210 is smaller than non-oriented bounding box 220. When there is a line of text, the system can treat the entire line as a single object and define a single bounding box that encloses the entire text line.

Optionally, the system can tailor the shape of the simpler outline for each selected object. Regardless of its shape, each outline still encloses the corresponding selected object. The shape of an outline depends partly on the object's shape and can be a rectangle, a triangle, a circle, an ellipse, or a polygon. For example, when an image has a substantially circular selected object and a substantially rectangular selected object, the system defines a circular outline for the substantially circular selected object and a rectangular outline for the substantially rectangular selected object. Thus, in a given image, different objects can have simpler outlines of different shapes.

Referring back to FIG. 1, the system uses the original outlines of the non-abstracted objects to define their respective planar-mapping outlines (step 120). For example, a circle's planar-mapping outline is its original outline, i.e., its circumference.

The system uses the planar-mapping outlines of all objects to divide the received image into non-overlapping regions (step 130). The system performs this division by calculating the intersections of planar-mapping outlines. A planar-mapping process is further described in U.S. patent application Ser. No. 09/447,024, titled "Processing Complex Regions of Illustrated Artwork" and filed Nov. 22, 1999, which is hereby incorporated by reference. Associated with each region are those abstracted and non-abstracted objects whose individual planar-mapping outline encloses the region.

Figure 3:
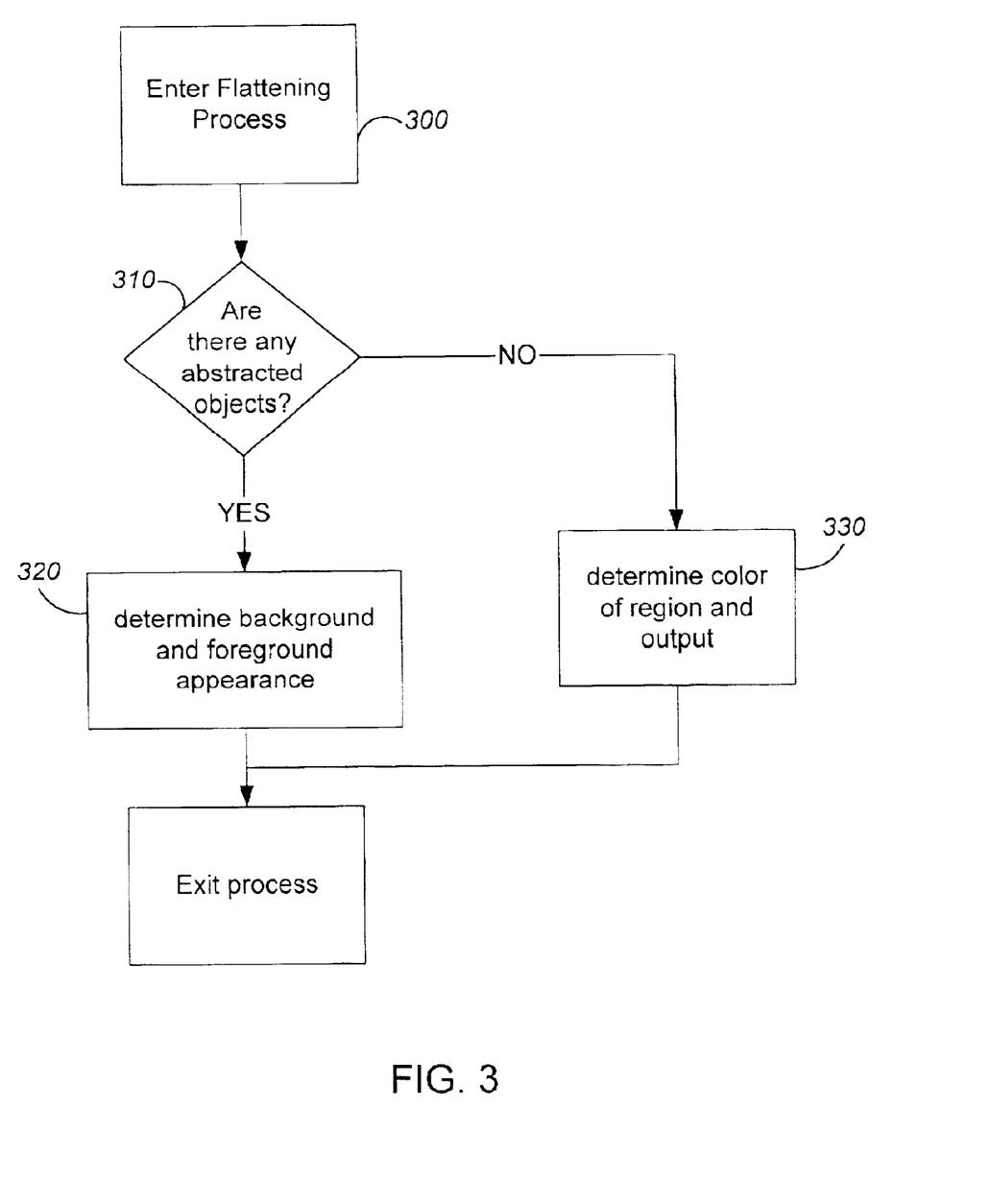
FIG. 3 is a flow chart of a method of flattening a region in accordance with the invention.

The system flattens each region formed from planar mapping (step 140). FIG. 3 shows a flattening process 300, one method of flattening a region in accordance with the present invention. The system determines if there are any abstracted objects associated with the region (step 310). If there are none, then the system blends the colors of the non-abstracted objects (step 330). Blending includes determining a resulting color based on properties such as transparency, color value, and paint order of objects involved. A blending process is further described in the above-referenced U.S. application Ser. No. 09/447,024. The system outputs the determined color value to an output stream of the method (step 330). The output stream of the method holds the data for outputting to a file or output device. If there are abstracted objects associated with the region, the system recursively determines background and foreground appearance for each abstracted object associated with the region (step 320).

Figure 4:
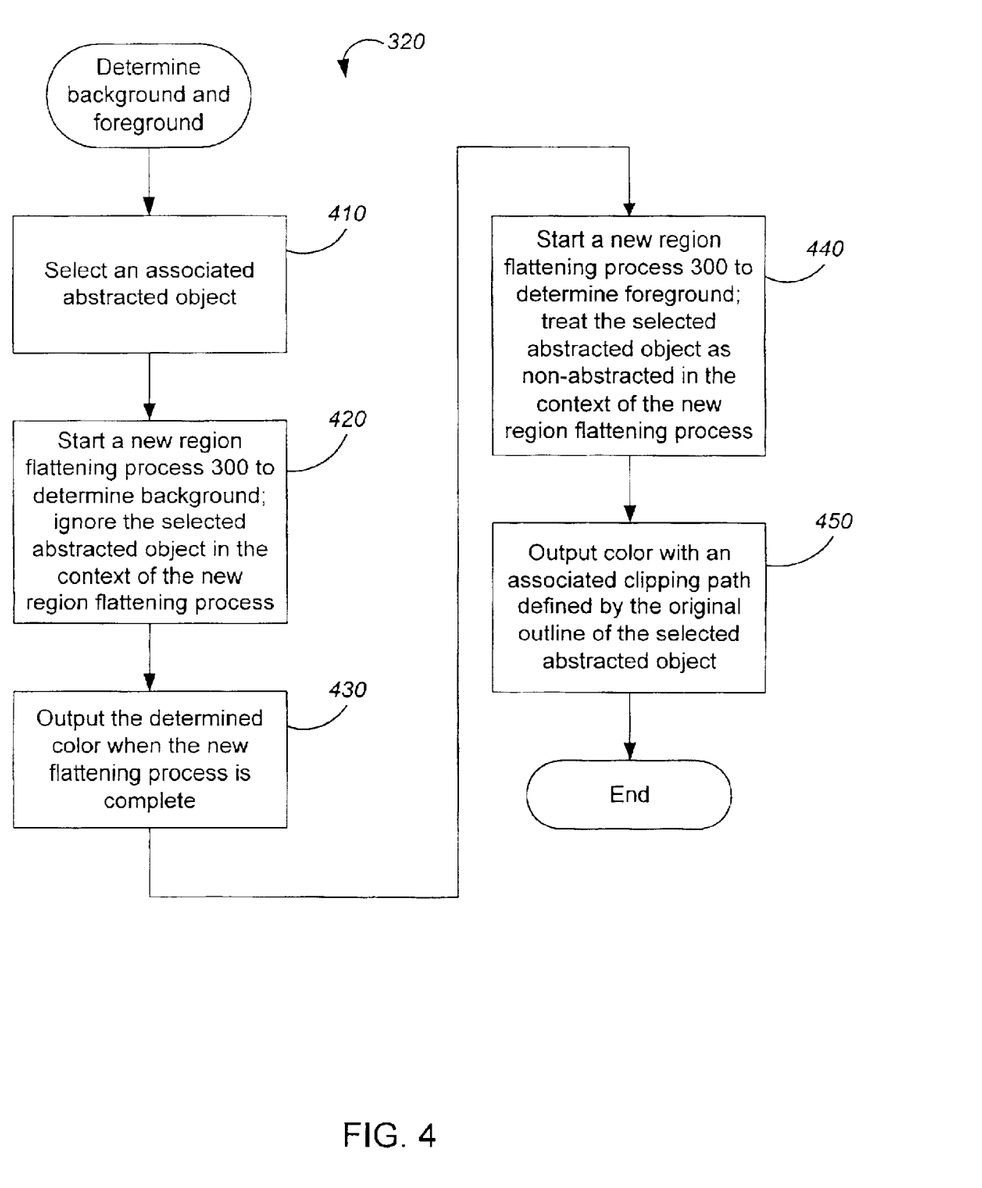
FIG. 4 is a flow chart of a method of determining background and foreground in accordance with the invention.

As shown in FIG. 4, recursively determining background and foreground appearance includes selecting any abstracted object associated with the region (step 410). To determine the background appearance, the system starts a new flattening process 300, in the context of which the selected abstracted object is temporarily ignored (step 420). After completing the new flattening process and outputting the result (step 430), the system determines the foreground appearance by starting yet another flattening process 300, in the context of which the currently selected abstracted object is temporarily treated as a non-abstracted object. Upon completing this most recently started flattening process, the system outputs the result clipped by the original outline of the currently selected abstracted object (step 450). Here, the system performs the clipping operation by setting the clipping path to the segment paths that represent the abstracted object's original outline. The recursion ends when all abstracted objects associated with the region have been selected.

Figure 5A:
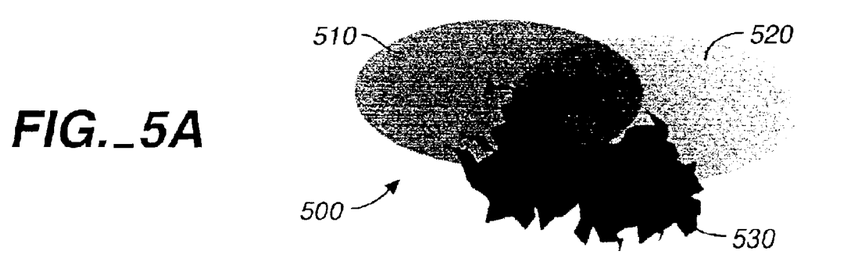
FIG. 5A shows a received image.
Figure 5B:
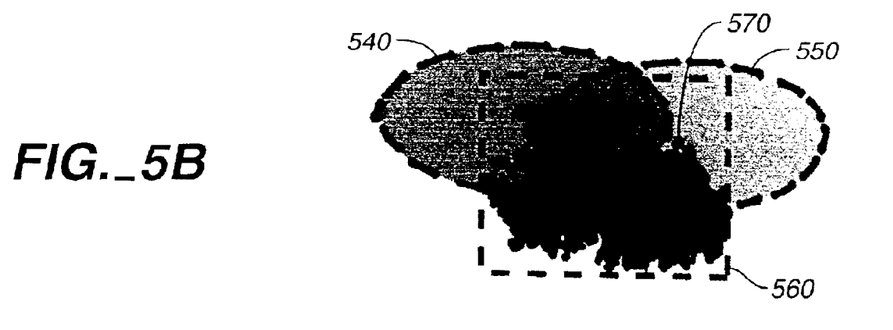
FIG. 5B shows outlines of objects in the received image.
Figure 5C:
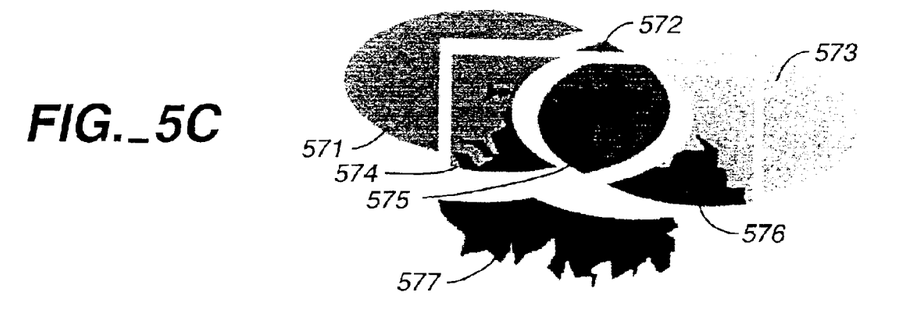
FIG. 5C shows planar mapping the received image into regions.
Figure 5D:
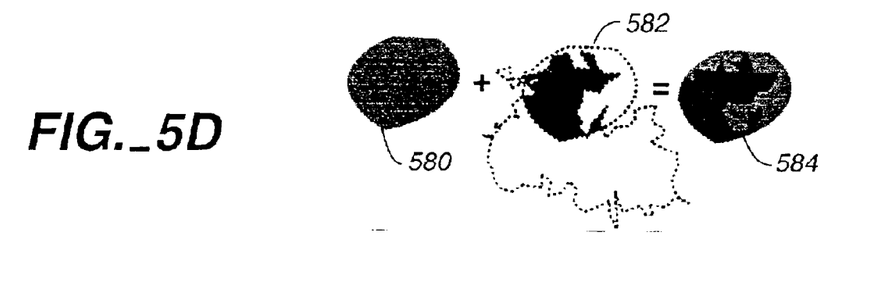
FIG. 5D shows flattening a region of the received image.

FIGS. 5A–D show an example of flattening an image in accordance to method 100. As shown in FIG. 5A, the system receives an image 500 that contains transparent ellipses 510, 520 and abstracted object 530. The system uses original outlines 540 and 550, shown in FIG. 5B, to define planar-mapping outlines for ellipses 510 and 520, respectively (step 120). For abstracted object 530, the system defines its planar-mapping outline as bounding box 560 instead of original outline 570. From relatively simple planar-mapping outlines 540, 550, and 560, the system divides the received image into regions 571–77 as shown in FIG. 5C (step 130). The system then flattens regions 571–77 (step 140). For regions not having associated abstracted objects, such as regions 571–73, the system blends the colors of associated non-abstracted objects and outputs the determined color (step 330). For regions having associated abstracted objects, such as region 575, the system determines a background appearance by blending the colors of ellipses 510 and 520 (step 420), and then outputting the determined color (step 430). The system temporarily ignores abstracted object 530 during this operation. The system determines foreground appearance by blending the colors of ellipses 510, 520 and abstracted object 530 (step 440). The system then outputs the determined color clipped to the original outline of abstracted object 530 (step 450). The system represents each region by drawing the background and then drawing the abstracted object clipped to the region's outline. For example, as shown in FIG. 5D, the system draws background color 580 and then draws foreground color clipped to the region's outline 582 to obtain the regions final appearance 584. Note that the foreground color is clipped twice, once by the abstracted object's original outline and a second time by the region's outline. Flattening each region results in an image without transparency that is visually identical to the original image.

Figure 6A:
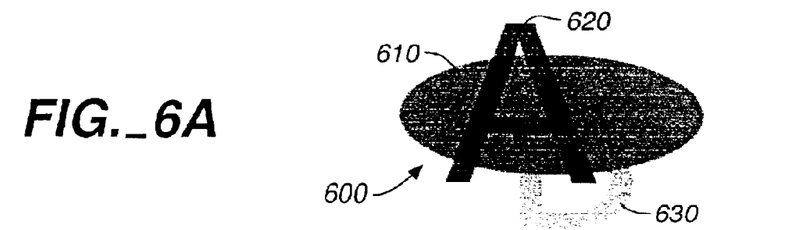
FIG. 6A shows another received image.
Figure 6B:
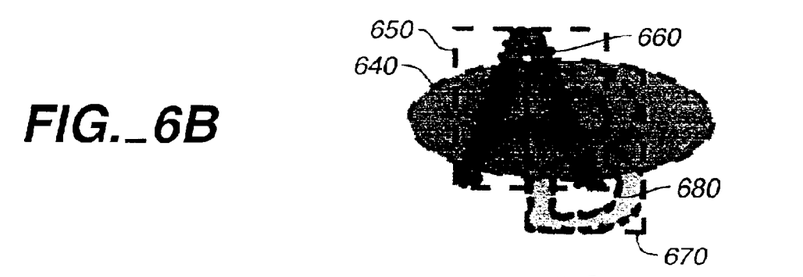
FIG. 6B shows outlines of objects in the received image.
Figure 6C:
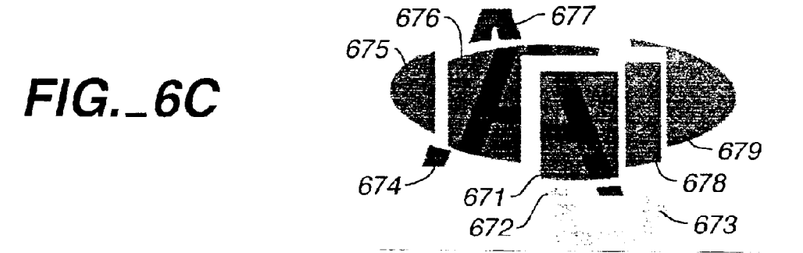
FIG. 6C shows planar mapping the received image into regions.

FIGS. 6A–D show another example of flattening an image in accordance to method 100. As shown in FIG. 6A, the received image 600 contains transparent ellipse 610, and overlapping transparent letters "A" 620 and "B" 630. The system defines planar-mapping outlines (step 120). As shown in FIG. 6B, the system uses original outline 640 to define a planar-mapping outline for ellipse 610. For the letter "A" 620, the system defines its planar-mapping outline as bounding box 650 instead of original outline 660. Similarly, the system defines a planar-mapping outline for the letter "B" 630 as bounding box 670 instead of original outline 680. From relatively simple planar-mapping outlines 640, 650, and 670, the system divides the received image into regions 671–79 as shown in FIG. 6C (step 130). The system then flattens each of regions 671–79 (step 140). For regions having no more than one associated abstracted object, the flattening is the same as that described in FIG. 5D.

For regions having more than one associated abstracted object, such as region 671, the system recursively performs flattening process 300. As was shown in FIGS. 3 and 4, the system determines if there are any abstracted objects associated with region 671 (step 310). Since the letters "A" and "B" are both abstracted objects, the system determines background and foreground appearance for region 671 (step 320). The system selects the letter "B" (step 410) and starts a first recursion of flattening process 300 to determine the background of the region with respect to the letter "B", in the context of which the system temporarily ignores the currently selected abstracted object, the letter "B" (step 420). In the first recursion of flattening process 300, the system determines if there are any associated abstracted objects (step 310). Since there is one, i.e., the letter "A", the system determines background and foreground appearance (step 320). The system selects the remaining abstracted object (step 410), the letter "A" (as "B" is being ignored), and starts a second recursion of flattening process 300 to determine the background of the region with respect to the letter "A", in the context of which the system temporarily ignores the currently selected abstracted object, the letter "A" (step 420). In this second recursion, the system again determines if there are associated abstracted objects (step 310). There are none because both letters are being ignored. The system blends the colors of the remaining associated object, ellipse 610, and then outputs the determined color (step 330), thereby completing the second recursion of flattening process 300. This determined background is shown as element 690 of FIG. 6D. The system continues with the first recursion, determining the foreground of the region with respect to the letter "A" by starting yet another flattening process 300, a third recursion in the context of which the system treats the currently selected abstracted object, the letter "A", as a non-abstracted object and clips the determined color to the original outline of the letter "A" (step 430). In the third recursion, the system determines if there are any associated abstracted objects (step 310). Since "B" is still being ignored and "A" is now set as a non-abstracted object, there are no associated abstracted objects and, accordingly, the system blends the colors of ellipse 630 and the letter "A" (step 330). The determined color, clipped by the original outline of the letter "A" is outputted (step 430), thereby completing the third and second recursions. At this point the system has determined the background of the region with respect to the letter "B" by determining the background and the foreground of the letter "A" (elements 690 and 692, respectively, of FIG. 6D).

Figure 6D:
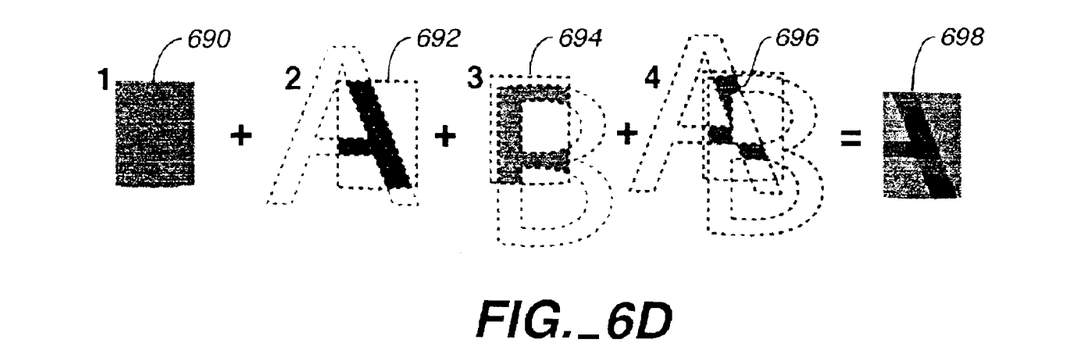
FIG. 6D shows flattening a region of the received image.

The system now continues the first recursion, determining the foreground of the region with respect to the letter "B" by starting a fourth recursion, in the context of which the system temporarily treats the letter "B" as a non-abstracted object and clips the determined color to the original outline of the letter "B" (step 420). In the fourth recursion, the system determines if there are any associated abstracted objects (step 310). Since the system is treating the letter "B" as a non-abstracted object in this fourth recursion, the system selects the remaining associated abstracted object, the letter "A" (step 410), and starts a fifth recursion in the context of which the letter "A" is temporarily ignored (step 420). In this fifth recursion, the system determines if there are any associated abstracted objects (step 310). Since "B" is currently treated as a non-abstracted object and "A" is being ignored, there are no associated abstracted objects. Consequently, the system blends the colors of ellipse 710 and "B" (step 330), and outputs the determined color to the fourth recursion where the determined color is clipped by the original outline of the letter "B" (step 420), thereby completing the fifth recursion. This determined appearance is shown as element 694 in FIG. 6D. Continuing with the fourth recursion, the system starts a sixth recursion to determine the foreground of the region with respect to the letter "A", in the context of which the system temporarily treats the letter "A" as a non-abstracted object and clips the determined color to the original outline of the letter "A" (step 430). In this sixth recursion, the system currently treats both letters as non-abstracted objects. Hence, the system determines that there are no associated abstracted objects (step 310), and thus blends the colors of ellipse 610 and the letters "A" and "B" (step 330). The system outputs this determined color to the fourth recursion, clipped by the original outline of the letter "A" (step 450), thereby completing the sixth recursion. Note that in the current process of the fourth recursion, the outputted color is further clipped by the original outline of the letter "B" (step 450). Effectively, the determined color is clipped by the intersection of the original outlines of the letters and outputted, thereby completing the fourth and first recursion and the underlying flattening process. This determined appearance is shown as element 696 in FIG. 6D. As shown in FIG. 6D, the system combines elements 690–96 of region 671 to obtain result 698. In another implementation, dividing an image into regions can be performed so that abstracted objects do not divide outlines of other objects. In this implementation, a system uses the planar-mapping outlines of the non-abstracted objects, but not abstracted objects, to separate the image into regions that can overlap. Consequently, none of the regions formed are intersected by a planar-mapping outline of a non-abstracted object but can be intersected by a planar-mapping outline of an abstracted object.

Figure 7A:
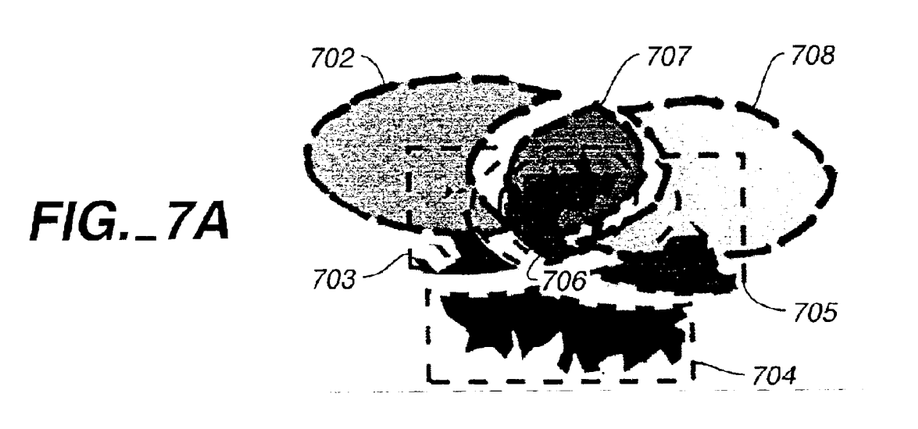
FIG. 7A shows an example of dividing an image into regions in an alternate implementation of the invention.
Figure 7B:
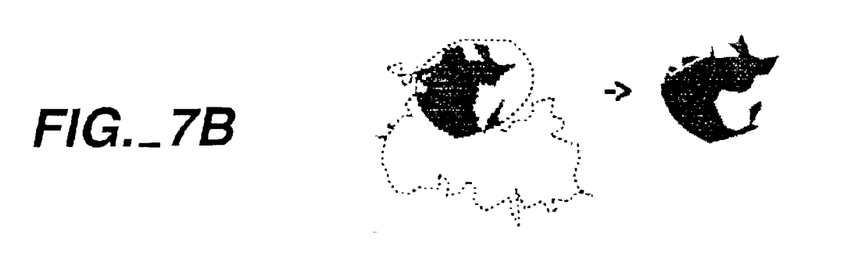
FIG. 7B shows an example of flattening a region in accordance with the alternate implementation of the invention.

For example, a system receives the image shown in FIG. 5A. The system defines planar-mapping outlines in a similar manner shown in FIG. 5B. Unlike the planar mapping shown in FIG. 5C, dividing the image into regions according to the alternate implementation, as shown in FIG. 7A, separates the image into regions 702–08, some of which overlap. As is shown in FIG. 7B, the system represents each region having an associated abstracted object by drawing the abstracted object through the region. No drawing of the background is necessary when there are no abstracted objects or abstracted objects temporarily treated as non-abstracted objects because the background has not been clipped by these objects.

Figure 8:
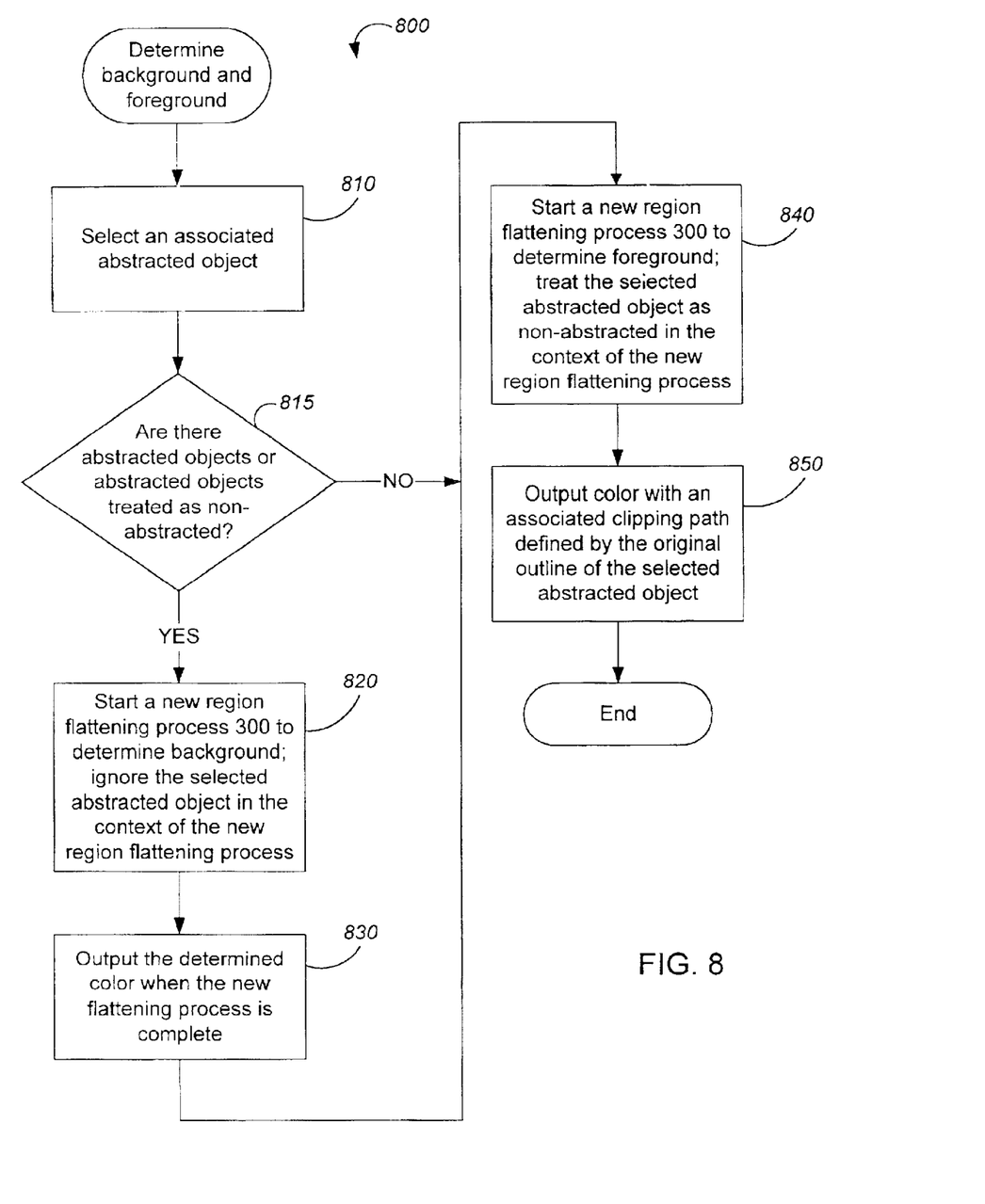
FIG. 8 is a flow chart of a method of flattening in the alternate implementation of the invention.

FIG. 8 shows an alternative to flattening process 320, the only difference being the addition of step 815. In flattening method 300, there are five possible types of objects: abstracted objects, non-abstracted objects, currently selected abstracted objects, currently ignored abstracted objects, and abstracted objects currently treated as non-abstracted objects. In step 815, the system determines whether there are abstracted objects, or abstracted objects currently treated as non-abstracted objects, excluding the currently-selected one. If there are, the system performs step 820. Otherwise, the system skips step 820 and proceeds to step 840.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention.

For example, instead of a bounding box, the simpler outline can have any elementary shape such as an ellipse, a circle, a quadrangle, or a polygon. The polygon can have a pre-defined maximum number of edges. Alternatively, the system can rasterize a selected object and use the rasterized object's rectangular bounds as its planar-mapping outline.

When a region has multiple abstracted objects, instead of recursively determining background and foreground, the system iteratively determines background and foreground for the region.

Flattening a region (step 140) can involve rasterizing instead of blending and clipping. The system rasterizes portions of objects inside the region. The system then determines a color value for each pixel in the region based on the colors and other properties of objects represented by the pixel.

Method 100 can be applied to objects in non-PostScript® formats, such as objects in the Folio, TrueType, and IKARUS formats. Accordingly, other implementations are within the scope of the following claims.

What is claimed is:

1. A method of processing an image, comprising:
receiving an image having multiple objects, each object having an original outline;
selecting objects from among the multiple objects to be abstracted objects;
defining a planar-mapping outline for each object, the planar-mapping outline of each selected object being an enclosing outline that encloses the object, and the planar-mapping outline of each object not selected being the original outline of the object;
using the planar-mapping outlines of all the objects to divide the image into non-overlapping regions; and
flattening each region.

2. The method of claim 1, wherein selecting objects includes selecting text objects.

3. The method of claim 1, wherein selecting objects includes selecting objects having resolution-dependent outlines.

4. The method of claim 1, wherein a first region contains a portion of a transparent object overlying a portion of a second object, and wherein flattening the region includes blending the transparent object portion with the second object portion in the region.

5. The method of claim 1, wherein defining a planar-mapping outline includes defining a polygon to enclose a corresponding selected object with a predefined maximum number of edges.

6. The method of claim 5, wherein the polygon is calculated to have a smallest area while enclosing the corresponding selected object.

7. The method of claim 1, wherein defining a planar-mapping outline for a selected object includes defining a quadrangle.

8. The method of claim 7, wherein defining a quadrangle includes defining a bounding box of the selected object.

9. The method of claim 8, wherein defining a bounding box includes determining an orientation of the bounding box that results in a minimal bounding-box size.

10. The method of claim 1, wherein each planar-mapping outline is represented in an analytical resolution-independent form.

11. The method of claim 1, wherein dividing the image into regions includes associating with each region all objects having a planar-mapping outline that encloses the region.

12. The method of claim 11, wherein flattening a region comprises:
determining if there is an abstracted object associated with the region;
when there are no abstracted objects associated with the region, determining a color of the region based on properties of the objects associated with the region; and
when there is a single abstracted object associated with the region, determining a background color and a foreground color of the region, the background color being based solely on properties of non-abstracted objects associated with the region and the foreground color being based on properties of all the objects associated with the region.

13. The method of claim 12, wherein determining background and foreground colors of the region further comprises outputting to an output stream the determined background color and outputting to the output stream the determined foreground color and an associated clipping path defined by the original outline of the abstracted object.

14. The method of claim 12, wherein determining the color of the region when there are no abstracted objects associated with the region further comprises outputting the determined color to an output stream of the method.

15. The method of claim 14, wherein determining background and foreground colors further comprises determining background and foreground colors of the region for each abstracted object associated with the region when there are multiple abstracted objects associated with the region.

16. The method of claim 15, wherein determining background and foreground colors for each abstracted object includes:
selecting an abstracted object associated with the region;
starting a new region flattening process to determine a background color of the region, ignoring the selected abstracted object in the new region flattening process, and outputting to the output stream the background color; and
starting a new region flattening process to determine a foreground color of the region, treating the selected abstracted object as a non-abstracted object in the new region flattening process, and outputting to the output stream the foreground color with an associated clipping path defined by the original outline of the selected abstracted object.

17. The method of claim 16, wherein outputting foreground color includes setting multiple clipping paths of abstracted objects associated with the region to define an area of the region that is inside an intersection of original outlines of the abstracted objects.

18. The method of claim 11, wherein flattening a region includes rasterizing portions of objects that are inside the region.

19. The method of claim 1, wherein defining a planar-mapping outline includes rasterizing a selected object and using the raster's rectangular bounds as the selected object's planar-mapping outline, whereby the selected object becomes a non-abstracted object.

20. A method for flattening an image, comprising:
receiving an image having multiple objects, each object having an original outline;
selecting objects from among the multiple objects to be abstracted objects;
defining a planar-mapping outline for each object, the planar-mapping outline of each selected object being an enclosing outline that encloses the object, and the planar-mapping outline of each object not selected being the original outline of the object;
using the planar-mapping outlines of the non-abstracted objects to separate the image into regions that can overlap, none of the regions being intersected by a planar-mapping outline of a non-abstracted object; and
flattening each region.

21. The method of claim 20, wherein selecting objects includes selecting text.

22. The method of claim 20, wherein selecting objects includes selecting objects having resolution-dependent outlines.

23. The method of claim 20, wherein defining an enclosing outline for a selected object includes defining a bounding box of the selected object.

24. The method of claim 23, wherein defining a bounding box includes determining an orientation of the bounding box that results in a minimal bounding-box size.

25. The method of claim 20, wherein each planar-mapping outline is represented in an analytical resolution-independent form.

26. A method of planar mapping, comprising:
receiving an image having multiple objects, each object having an original outline, the image having at least one of a text object and an object with a resolution-dependent outline;
defining a planar-mapping outline for each text object and each object with resolution-dependent outline, a planar-mapping outline for an object being a bounding box of a minimal size that encloses the object, the bounding box being oriented about the object to reduce the size of the bounding box;
using as the planar-mapping outline of each of the remaining objects in the image the original outline of the object; and
using the planar-mapping outlines of all the objects to divide the image into non-overlapping regions and associating with each such region all objects having a planar-mapping outline that encloses the region.

27. A computer program product, tangibly stored on a computer-readable medium, for processing an image, comprising instructions operable to cause a programmable processor to:
receive an image having multiple objects, each object having an original outline;
select objects from among the multiple objects to be abstracted objects;
define a planar-mapping outline for each object, the planar-mapping outline of each selected object being an enclosing outline that encloses the object, and the planar-mapping outline of each object not selected being the original outline of the object;
use the planar-mapping outlines of all the objects to divide the image into non-overlapping regions; and
flatten each region.

28. The computer program product of claim 27, wherein instructions to select objects includes instructions to select text objects or objects having resolution-dependent outlines.

29. The computer program product of claim 27, wherein a first region contains a portion of a transparent object overlying a portion of a second object, and wherein instructions to flatten the region includes instructions to blend the transparent object portion with the second object portion in the region.

30. The computer program product of claim 27, wherein instructions to define a planar-mapping outline includes instructions to define a polygon to enclose a corresponding selected object with a predefined maximum number of edges.

31. The computer program product of claim 30, wherein the polygon is calculated to have a smallest area while enclosing the corresponding selected object.

32. The computer program product of claim 27, wherein instructions to define a planar-mapping outline for a selected object includes instructions to define a quadrangle.

33. The computer program product of claim 32, wherein instructions to define a quadrangle includes instructions to define a bounding box of the selected object.

34. The computer program product of claim 33, wherein instructions to define a bounding box includes instructions to determine an orientation of the bounding box that results in a minimal bounding-box size.

35. The computer program product of claim 27, wherein each planar-mapping outline is represented in an analytical resolution-independent form.

36. The computer program product of claim 27, wherein instructions to divide the image into regions includes instructions to associate with each region all objects having a planar-mapping outline that encloses the region.

37. The computer program product of claim 36, wherein instructions to flatten a region comprises instructions to:
determine if there is an abstracted object associated with the region;
when there are no abstracted objects associated with the region, determine a color of the region based on properties of the objects associated with the region; and
when there is a single abstracted object associated with the region, determine a background color and a foreground color of the region, the background color being based solely on properties of non-abstracted objects associated with the region and the foreground color being based on properties of all the objects associated with the region.

38. The computer program product of claim 37, wherein instructions to determine background and foreground colors of the region further comprises instructions to output to an output stream the determined background color and output to the output stream the determined foreground color and an associated clipping path defined by the original outline of the abstracted object.

39. The computer program product of claim 37, wherein instructions to determine the color of the region when there are no abstracted objects associated with the region further comprises instructions to output the determined color to an output stream.

40. The computer program product of claim 39, wherein instructions to determine background and foreground colors further comprises instructions to determine background and foreground colors of the region for each abstracted object associated with the region when there are multiple abstracted objects associated with the region.

41. The computer program product of claim 40, wherein instructions to determine background and foreground colors for each abstracted object includes instructions to:
select an abstracted object associated with the region;
start a new region flattening process to determine background color of the region, ignore the selected abstracted object in the new region flattening process, and output to the output stream the background color; and
start a new region flattening process to determine a foreground color of the region, treat the selected abstracted object as a non-abstracted object in the new region flattening process, and output to the output stream the foreground color with an associated clipping path defined by the original outline of the selected abstracted object.

42. The computer program product of claim 41, wherein instructions to output foreground color includes instructions to set multiple clipping paths of abstracted objects associated with the region to define an area of the region that is inside an intersection of original outlines of the abstracted objects.

43. The computer program product of claim 36, wherein instructions to flatten a region includes instructions to rasterize portions of objects that are inside the region.

44. The computer program product of claim 27, wherein instructions to define a planar-mapping outline includes instructions to rasterize a selected object and use the raster's rectangular bounds as the selected object's planar-mapping outline, whereby the selected object becomes a non-abstracted object.

45. A computer program product, tangibly stored on a computer-readable medium, for flattening an image, comprising instructions operable to cause a programmable processor to:

receive an image having multiple objects, each object having an original outline;

select objects from among the multiple objects to be abstracted objects;

define a planar-mapping outline for each object, the planar-mapping outline of each selected object being an enclosing outline that encloses the object, and the planar-mapping outline of each object not selected being the original outline of the object;

use the planar-mapping outlines of the non-abstracted objects to separate the image into regions that can overlap, none of the regions being intersected by a planar-mapping outline of a non-abstracted object; and flatten each region.

46. The computer program product of claim 45, wherein instructions to select objects includes instructions to select text or objects having resolution-dependent outlines.

47. The computer program product of claim 45, wherein instructions to define an enclosing outline for a selected object includes instructions to define a bounding box of the selected object.

48. The computer program product of claim 47, wherein instructions to define a bounding box includes instructions to determine an orientation of the bounding box that results in a minimal bounding-box size.

49. The computer program product of claim 45, wherein each planar-mapping outline is represented in an analytical resolution-independent form.

50. A computer program product, tangibly stored on a computer-readable medium, for planar mapping, comprising instructions operable to cause a programmable processor to:

receive an image having multiple objects, each object having an original outline, the image having at least one of a text object and an object with a resolution-dependent outline;

define a planar-mapping outline for each text object and each object with resolution-dependent outline, a planar-mapping outline for an object being a bounding box of a minimal size that encloses the object, the bounding box being oriented about the object to reduce the size of the bounding box;

use as the planar-mapping outline of each of the remaining objects in the image the original outline of the object; and use the planar-mapping outlines of all the objects to divide the image into non-overlapping regions and associating with each such region all objects having a planar-mapping outline that encloses the region.

\* \* \* \* \*

UNITED STATES PATENT AND TRADEMARK OFFICE
CERTIFICATE OF CORRECTION

PATENT NO. : 6,859,553 B1
DATED : February 22, 2005
INVENTOR(S) : Lubomir D. Bourdev et al.

It is certified that error appears in the above-identified patent and that said Letters Patent is hereby corrected as shown below:

Column 12,
Line 41, after "determine", insert -- a --;

Signed and Sealed this

Thirty-first Day of May, 2005

JON W. DUDAS
*Director of the United States Patent and Trademark Office*